(12) United States Patent
Kim et al.

(10) Patent No.: US 8,803,919 B2
(45) Date of Patent: Aug. 12, 2014

(54) DISPLAY APPARATUS AND IMAGE DISPLAY METHOD THEREOF

(75) Inventors: Jae-hwan Kim, Seongnam-si (KR); Seung-soo Kang, Uijeongbu-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 380 days.

(21) Appl. No.: 12/556,333

(22) Filed: Sep. 9, 2009

(65) Prior Publication Data
US 2010/0066666 A1 Mar. 18, 2010

(30) Foreign Application Priority Data

Sep. 12, 2008 (KR) .................. 10-2008-0090396

(51) Int. Cl.
*G09G 5/00* (2006.01)

(52) U.S. Cl.
USPC ........... 345/659; 345/156; 345/158; 345/159; 345/162; 345/56; 345/619; 345/688; 345/689

(58) Field of Classification Search
None
See application file for complete search history.

(56) References Cited

U.S. PATENT DOCUMENTS

2006/0123362 A1* 6/2006 Keely ........................... 715/857
2006/0195252 A1* 8/2006 Orr et al. ........................ 701/200
2008/0068340 A1* 3/2008 Landschaft et al. .......... 345/169
2008/0180408 A1* 7/2008 Forstall et al. ................ 345/177

FOREIGN PATENT DOCUMENTS

KR 10-2008-0029553 A 4/2008

* cited by examiner

*Primary Examiner* — Joseph Haley
*Assistant Examiner* — Ifedayo Iluyomade
(74) *Attorney, Agent, or Firm* — Sughrue Mion, PLLC

(57) ABSTRACT

A display apparatus and an image display method thereof are provided. The display apparatus automatically displays images stored in a memory in a pre-set order, and displays the images in various sequences if a change in position of the display apparatus is detected by a motion sensor. Accordingly, the sequence in which the images are displayed is easily changed.

13 Claims, 8 Drawing Sheets

DISPLAY APPARATUS AND IMAGE DISPLAY METHOD THEREOF

CROSS-REFERENCE TO RELATED APPLICATIONS

This application claims priority from Korean Patent Application No. 2008-90396, filed on Sep. 12, 2008 in the Korean Intellectual Property Office, the disclosure of which is incorporated herein by reference in its entirety.

BACKGROUND OF THE INVENTION

1. Field of the Invention

Apparatuses and methods consistent with the present invention relate to a display apparatus and an image display method thereof, and more particularly, to a display apparatus which displays images stored in an external memory or an internal memory in a slideshow on a screen, and an image display method thereof.

2. Description of the Related Art

A display apparatus, such as an electronic picture frame, a mobile phone, a portable multimedia player (PMP), or other display apparatus known in the art, displays on a screen images such as photos or moving pictures stored in a memory. When such a conventional display apparatus changes the order of a slideshow, it requires complicated steps, such as entering a menu to change settings or an additional manipulation interface such as a specific button to change the order of the slideshow. That is, a user is required to perform several manipulating steps in order to view a previous image during the slideshow or to change the order of the slideshow. This deteriorates usability of the display apparatus.

SUMMARY OF THE INVENTION

Exemplary embodiments of the present invention address the above disadvantages and other disadvantages not described above. Also, the present invention is not required to overcome the disadvantages described above, and an exemplary embodiment of the present invention may not overcome any of the problems described above.

Exemplary embodiments of the present invention provide a display apparatus which detects a position of the display apparatus and changes the order of a slideshow variously according to the detected position, and an image display method thereof. Therefore, a more intuitive or more effective control can be achieved compared to a control by changing settings through a button or a menu.

According to an aspect of the present invention, there is provided a method of displaying images on a display apparatus, the method including performing a slideshow in a pre-set order, detecting a change in position of the display apparatus, and performing a slideshow in a changed order corresponding to the changed position.

If the change in position is made by turning the display apparatus upside down, the changed order may be the reverse of the pre-set order.

The method may further comprise displaying a list of images as a thumbnail along with a current image for a pre-determined time after detection of the change in position.

The predetermined time may be set by a user.

The thumbnail may be displayed on a changed location corresponding to the changed position.

The thumbnail may move in a direction corresponding to the order of the slideshow.

The slideshow may slide images in a direction corresponding to a gravity direction.

The method may further include, if the change in position is detected, changing at least one of a display location and a direction of the images to correspond to the changed position, thereby allowing a user to recognize that a current scene configuration of the display apparatus is the same as a previous configuration.

According to another aspect of the present invention, there is provided a display apparatus including a position change detector which detects change in a position, a storage unit which stores images, a signal processor which process the images, and a controller which arranges the images stored in the storage unit in pre-set order. If change in a position is detected by the position change detector, the pre-set order is changed to an order corresponding to the changed position, and the signal processor processes the images corresponding to the changed order. A display unit is also provided which displays the images processed by the signal processor.

If the position change detector detects that the display apparatus is turned upside down, the controller may change the pre-set order to the reverse order.

The controller may cause a list of images to be displayed as a thumbnail along with a current image for a predetermined time after the position change detector detects a change in position.

The signal processor may provide an interface through which a user sets a time, and the controller may set the time set through the interface as the predetermined time.

The controller may control the signal processor and the display unit to display the thumbnail in a changed location corresponding to the changed position.

The controller may control the signal processor and the display unit to display and shift the thumbnail in a direction corresponding to the order of a slideshow.

The slideshow may slide images in a direction corresponding to a gravity direction.

If the change in position is detected, the controller may change at least one of a display location and a direction of the images corresponding to the changed position, thereby allowing a user to perceive that a current scene configuration of the display apparatus is the same as a previous configuration.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS

Certain exemplary embodiments of the present invention will now be described in greater detail with reference to the accompanying drawings.

In the following description, the same drawing reference numerals are used for the same elements even in different drawings. The matters defined in the description, such as the detailed construction and elements, are provided to assist in a comprehensive understanding of the invention. Thus, it is apparent that the exemplary embodiments of the present invention can be carried out without those specifically defined matters. Also, well-known functions or constructions are not described in detail since they would obscure the invention with unnecessary detail.

Figure 1:
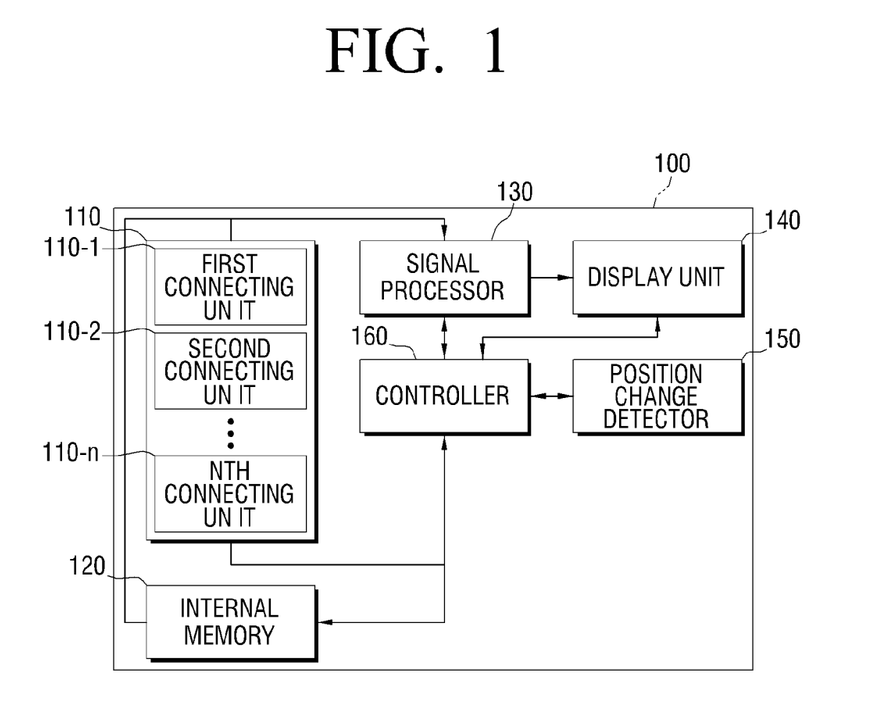
FIG. 1 is a block diagram illustrating a display apparatus according to an exemplary embodiment of the present invention.

FIG. 1 is a block diagram illustrating a display apparatus according to an exemplary embodiment of the present invention. The display apparatus of FIG. 1 may be an electronic photo frame, a mobile phone, a PMP, or other display apparatus known in the art.

Referring to FIG. 1, the display apparatus 100 comprises an external memory connecting unit 110, an internal memory 120, a signal processor 130, a display unit 140, a position change detector 150, and a controller 160.

The external memory connecting unit 110 may be at least one connecting unit or a plurality of connecting units such as $1^{st}$ to $n^{th}$ connecting units 110-1 to 110-n, to which external memories such as a secure digital (SD) memory, a compact flash (CF) memory, a universal serial bus (USB) memory, or other memory known in the art are connected. The external memory connected to the external memory connecting unit 110 stores images such as photos in a compression format such as Joint Photographic Experts Group (JPG), Bitmap, graphics interchange format (GIF), or other compression format known in the related art. Also, an external device having images stored therein, such as a personal computer or a digital camera, may be directly connected to the external memory connecting unit 110.

The internal memory 120 stores programs and various data required to perform a slideshow of the display apparatus 100, and stores images such as photos in the compression format of JPG.

The signal processor 130 decodes the images stored in the internal memory 120 or the external memory connected to the external memory connecting unit 110. If the images stored in the external memory or the internal memory 120 are photos, the images are compressed and stored in the format of JPG in general and the signal processor 130 decodes the JPG images. The signal processor 130 is also controlled by the controller 160 to perform scaling and splitting with respect to the decoded images to display the images in the form selected by the user.

The display unit 140 displays the images output from the signal processor 130 on a screen. The images are displayed on the screen of the display unit 140 in various manners as shown in FIGS. 2A to 3C. The display unit 140 is able to display the images in low voltage differential signaling (LVDS) method, transistor transistor logic (TTL) method or analog RGB method.

The position change detector 150 detects a user's motion or a change in a position of the display apparatus 100 due to the user's motion to control the display apparatus 100, and transmits the result of detection to the controller 160. The position change detector 150 may be a gyro sensor, a geomagnetic sensor, an acceleration sensor or combination thereof. The user may select how to display the images on the display apparatus 100 through the position change detector 150.

The controller 160 controls the display apparatus 100 according to a user command input through the position change detector 150. That is, the controller 160 controls the signal processor 130 and the display unit 140 to display the images stored in the external memory connected to the external memory connecting unit 110 or the internal memory 120 in an image display manner selected by the user command. The controller 160 will be described below in detail.

Figure 2A:
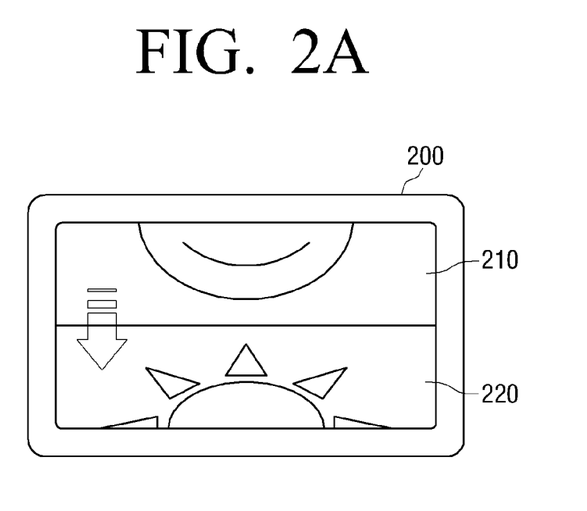
FIGS. 2A to 2C are exemplary views of images displayed on the display apparatus according to an exemplary embodiment of the present invention.
Figure 2B:
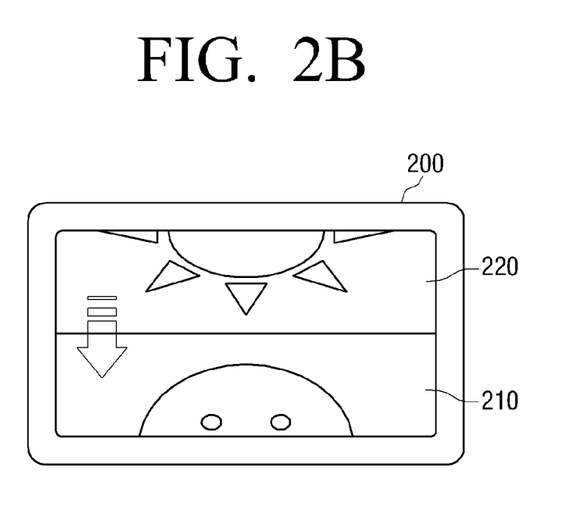
Figure 2C:
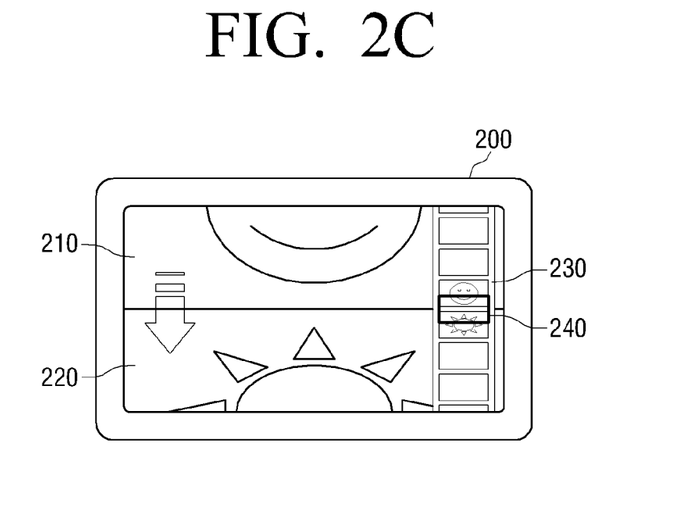

FIGS. 2A to 2C are exemplary views of images displayed on the display apparatus according to an exemplary embodiment of the present general inventive concept.

Referring to FIG. 2A, a screen 200 contains a first image 220 and a second image 210. The images are displayed in such a sequence that the first image 220 is displayed first and then the second image 210 is displayed. The first image 220 scrolls down with its lower part disappearing at a lower end of the screen 200 as if it moves down due to gravity, and the second image 210 also scrolls down with its lower part appearing from an upper end of the screen 200 as much as the first image 220 disappears until its entire image appears. That is, the second image 210 occupies the place where the first image 220 is displayed as the first image 220 moves down in the arrow direction. After a predetermined time, the second image 210 is replaced with the next image, a third image (not shown), in the same manner.

FIG. 2B is an exemplary view of images displayed if the display apparatus 100 is overturned, i.e., if the display apparatus is turned upside down. Referring to FIG. 2B, the second image 210 scrolls down with a lower part disappearing at a lower end of the screen i.e. in the arrow direction as if it moves down due to gravity, and the first image 220 scrolls down with a lower part appearing from an upper end of the screen 200 as much as the second image disappears until its entire image appears. Therefore, the images are shown in the reverse order to that of FIG. 2A. If the display apparatus 100 is turned upside down as shown in FIG. 2B, the first and the second images 220, 210 may change their respective positions upside down. For example, if the second image 210 is a face image of people as shown in FIG. 2A, the face image is turned upside down when the display apparatus 100 is overturned so that eye and lip are expressed in the same positions as in FIG. 2A.

FIG. 2C is an exemplary view of images displayed along with a thumbnail list 230 which is automatically displayed if a motion of the display apparatus 100 is detected by the position change detector 150.

As shown in FIG. 2C, the display apparatus 100 displays a thumbnail list 230 containing thumbnail images of relatively small sizes arranged on one side of the images displayed on the screen 200. If the display apparatus 100 is turned upside down or rotated by 90°, a displaying manner and a position of the thumbnail list 230 may be changed so that the thumbnail list 230 can be recognized as being displayed in a fixed position when seen from a user. For example, if the display apparatus 100 is turned by 180° with the thumbnail list 230 being displayed on the right side, the thumbnail list 230 is changed to the left side and the direction of the thumbnail list 230 is reversed so that the thumbnail list 230 can be always recognized as being displayed on the right side in the same direction when seen from the user. This is not limited to the thumbnail list 230 and is applicable to the first and the second images 220, 210 of FIGS. 2A and 2B.

Referring to FIG. 2C, the thumbnail list 230 has thumbnails arranged in a pre-set slideshow order and shows a current image and a next image. The thumbnail list 230 has a highlight 240 to indicate which image in the thumbnail list 230 corresponds to the image being currently displayed on the screen. The highlight 240 moves at the same speed as the image moves, and indicates which image is being currently displayed. If the display apparatus 100 is turned upside down, the moving direction of the highlight 240 may be reversed as described above.

The thumbnail list 230 may automatically appear by the motion of the display apparatus 100 and may automatically disappear after a predetermined time passes. The duration from appearance to disappearance may be set by a user. The duration may be set by a user directly inputting a command through a user interface window displayed on the screen.

The thumbnail list 230 may also be positioned on the middle of the screen without the highlight 240. In this case, the thumbnail list 230 may be movable on the screen in a direction. For example, the thumbnail list 230 may move down in the same direction as the gravity direction. If the position of the display apparatus 100 is changed upside down, the thumbnail list 230 moves in the opposite direction to the previous moving direction (as a result, in the same direction as the gravity direction). Also, each thumbnail image contained in the thumbnail list 230 may be displayed upside down so as to appear right side up to the user.

Figure 3A:
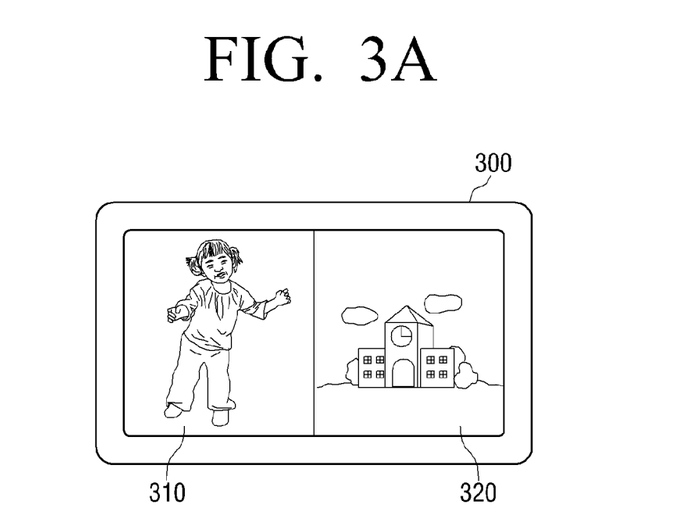
FIGS. 3A to 3C are exemplary views of images displayed on the display apparatus according to another exemplary embodiment of the present invention.
Figure 3B:
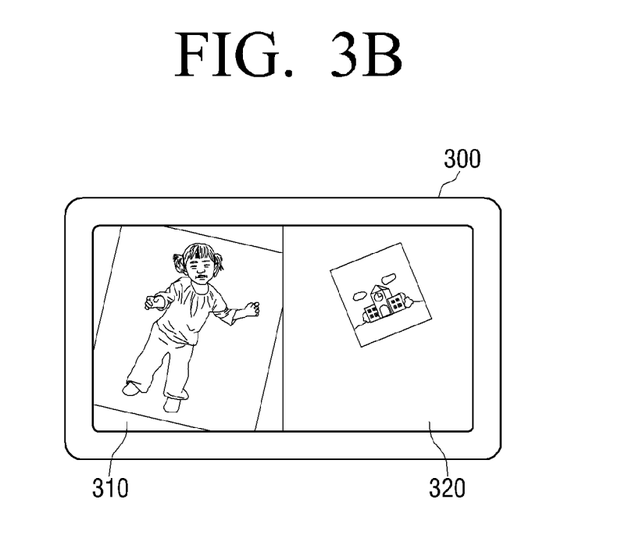
Figure 3C:
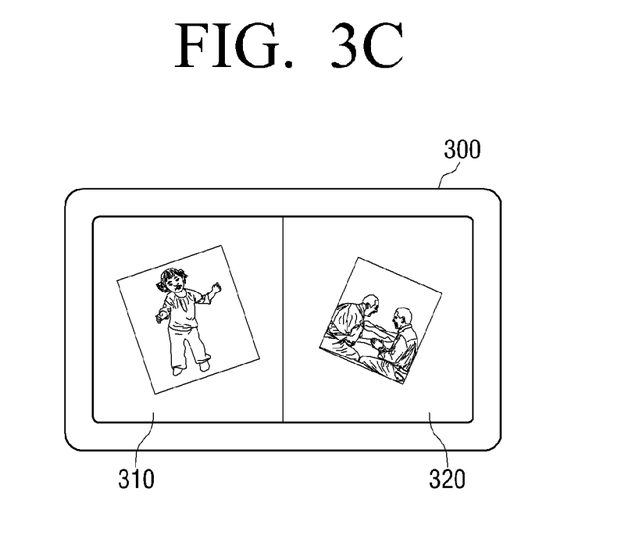

FIGS. 3A to 3C are exemplary views of images displayed on the display apparatus according to another exemplary embodiment of the present invention.

Referring to FIG. 3A, a screen 300 is divided into a first display area 310 and a second display area 320, which display images stored in different memories. For example, a user may set the screen 300 such that images stored in a SD memory connected to the external memory connecting unit 110 are displayed on the first display area 310 in sequence and images stored in the internal memory 120 are displayed on the second display area 320 in sequence. These images are displayed on the first display area 310 and the second display area 320 as a slideshow.

Alternatively, as shown in FIGS. 3B and 3C, the images are displayed on the first display area 310 and the second display area 320, showing the effect where the images are gradually reduced or enlarged in their sizes. For example, the user selects a CF memory and a USB memory connected to the external memory connecting unit 110 and selects displaying images on the first display area 310 and the second display area 320. Then, an image stored in the CF memory is gradually enlarged from a small size and displayed on the first display area 310. Then, the image is gradually reduced from the enlarged size and disappears. Next, another image stored in the CF memory is displayed on the first display area 310 in the same manner. The second display area 320 displays the images likewise. In the method described above, images are alternately displayed on the first display area 310 and the second display area 320 while being reduced or enlarged in their sizes.

Although the screen 300 is divided into two display areas 310, 320 by way of the examples in FIGS. 3A to 3C, it is possible to provide three or more display areas. In this case, it is also possible to display images stored in three or more memories on their respective display areas.

Also, although a memory is selected in the example of FIGS. 3A to 3C, images may be classified into types and may be stored in a plurality of folders of a single memory. In this case, one folder is selected from the plurality of folders and displayed on the first display area 310 and another folder is selected and displayed on the second display area 320.

Figure 4:
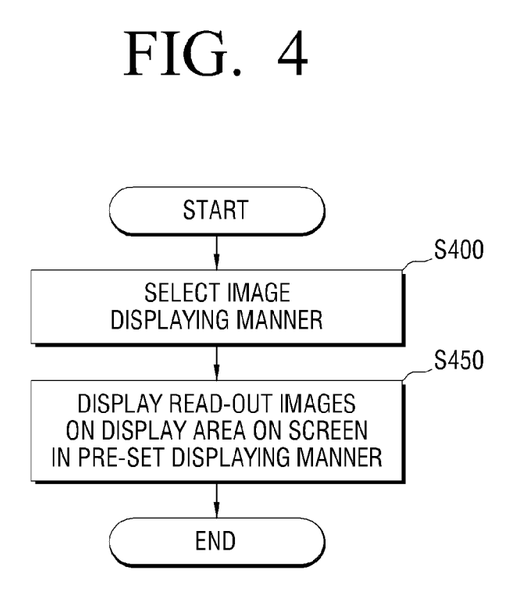
FIG. 4 is a flowchart illustrating operation of the display apparatus according to an exemplary embodiment of the present invention.

FIG. 4 is a flowchart illustrating operation of the display apparatus according to an exemplary embodiment of the present invention.

Referring to FIG. 4, the display apparatus 100 reads out images (S400) and displays the read-out images on a display area of a screen in a pre-set displaying manner (S450). That is, the controller 160 reads out images from an external memory connected to the external memory connecting unit 110 or the internal memory 120, and controls the signal processor 130 and the display 140 to display the read-out images in the manners illustrated in FIGS. 2A to 2C or FIGS. 3A to 3C.

Accordingly, the user is able to view the images displayed on the display apparatus 100 in various manners.

In the above embodiments, the display apparatus 100 is turned upside down. However, this should not be considered as limiting. The display apparatus 100 may be turned by 90° or 270°. In this case, the position change detector 150 notifies the controller 160 of the current position of the display apparatus 100 and the controller 160 controls the signal processor 130 to process the images according to the current position.

For example, if the display apparatus 100 is turned to the right by 90° with the first and the second images 220, 210 being displayed on the screen as shown in FIG. 2A, the first and the second images 220, 210 are turned to the right by 90°. In this state, the first and the second images 220, 210 may move down in the same direction as the gravity direction as shown in FIGS. 2A and 2B, or alternatively, may move from the right to the left in consideration of the rotation of 90°.

Figure 5:
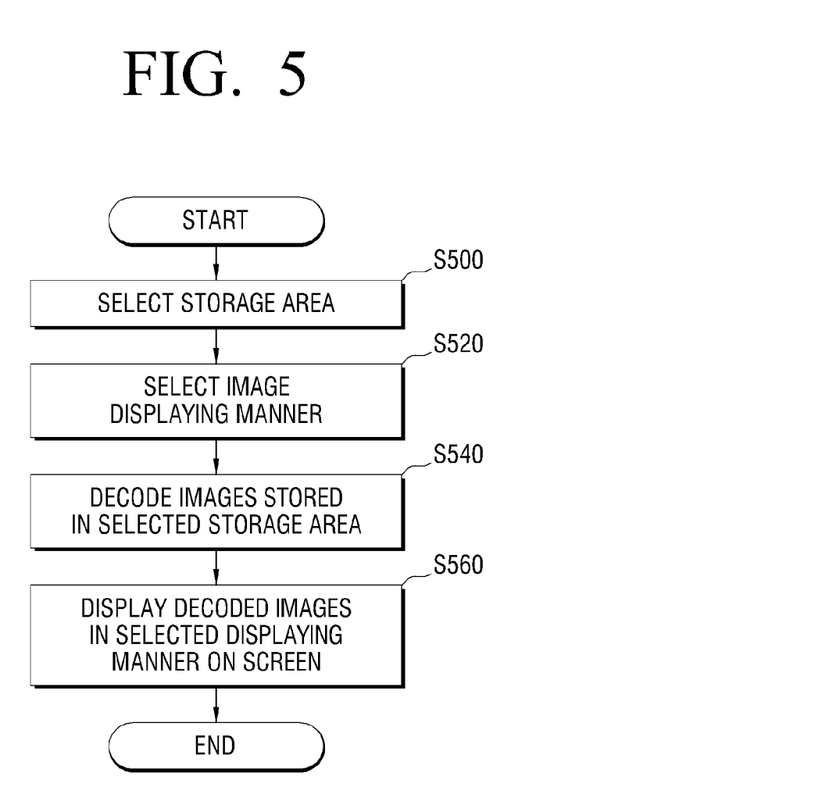
FIG. 5 is a flowchart to explain a method of displaying images of FIGS. 3A to 3C on the display apparatus.

FIG. 5 is a flowchart to explain a method of displaying images of FIGS. 3A to 3C on the display apparatus.

Referring to FIG. 5, a storage area from which an image is to be detected is selected according to a user command (S500) and an image displaying manner is selected (S520). That is, the user selects one of the memories connected to the external memory connecting unit 110 and the internal memory 120 that stores a desired image, and selects how to display the images stored in the selected storage area. For example, the user selects displaying the images stored in the USB memory on the first display area and displaying the images stored in the CF memory on the second display area.

The signal processor 130 decodes the images stored in the selected storage area (S540), and the display unit 140 displays the decoded images on the screen according to the selected display manner (S560). In other words, the controller 160 controls the signal processor 130 to decode the images stored in the selected memory and to perform scaling and splitting with respect to the decoded images. Then, the images stored in the USB memory are processed by the signal processor 130 and displayed on the first display area, whereas the images stored in the CF memory are processed by the signal processor 130 and displayed on the second display area.

In FIG. 5, a memory is selected and a storage area may be a memory or may be a plurality of folders which stores images classified into types.

Figure 6:
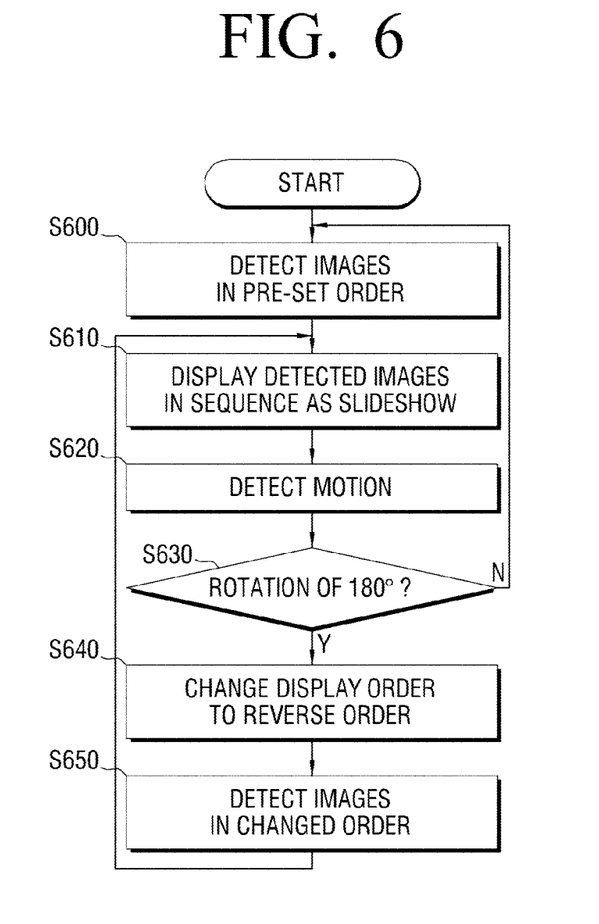
FIG. 6 is a flowchart to explain a method of displaying images of FIGS. 2A and 2B on the display apparatus.

FIG. 6 is a flowchart to explain a method of displaying images of FIGS. 2A to 2B on the display apparatus.

Referring to FIG. 6, the controller 160 detects images from the internal memory 120 or the external memory connected to the external connecting unit 110 according to a pre-set order (S600), and the signal processor 130 displays the detected images on the display unit 140 in sequence as a slideshow (S610). Motion is detected by the position change detector 150 while the slideshow is displayed (S620). If rotation by 180° is detected by the position change detector 150 (S630), the controller 160 changes the order of the slideshow to the reverse order of the pre-set order (S640). If the controller 160 detects the images according to the changed order (S650), the signal processor 130 displays the read-out images in the changed order on the display unit 140 as a slideshow. That is, the controller 160 controls the signal processor 130 and the display unit 140 to read out images from the external memory or the internal memory 120 to display on the screen, arrange the images in a pre-set order and read out images in the order of arrangement, and display the images on the screen as shown in FIGS. 2A to 2C.

Figure 7:
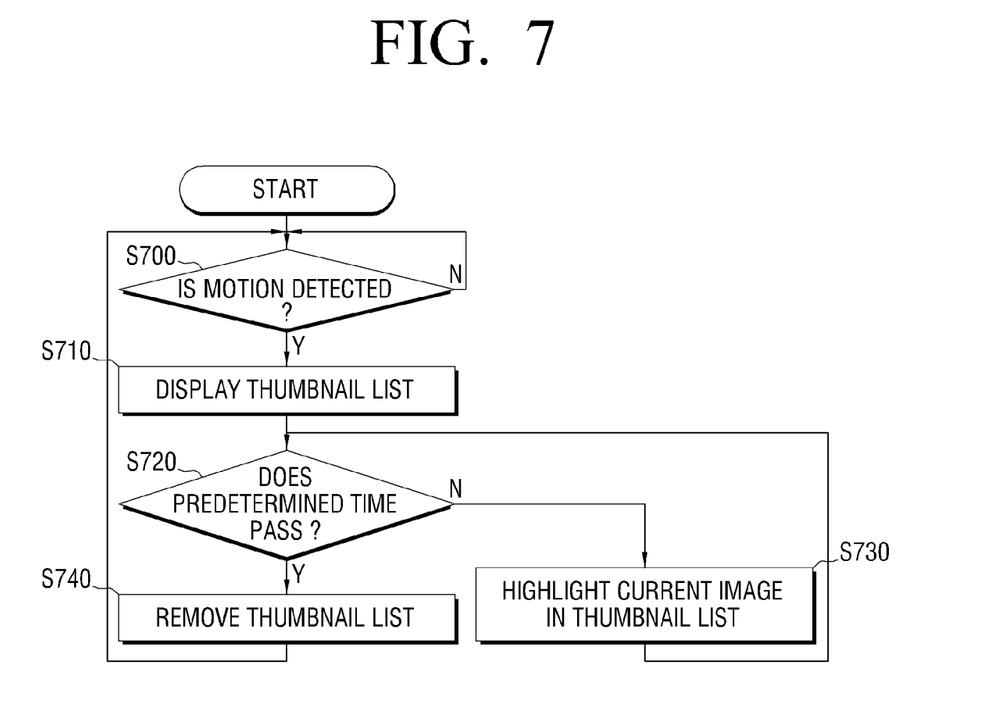
FIG. 7 is a flowchart to explain a method of displaying images of FIG. 2C on the display apparatus.

FIG. 7 is a flowchart to explain another method of displaying images on the display apparatus according to an exemplary embodiment of the present invention.

Referring to FIG. 7, if motion is detected by the position change detector 150 (S700), the signal processor 130 shows the thumbnail list 230 containing images stored in the internal memory or the external memory (S710). The thumbnail list 230 contains images arranged in a pre-set order. If a predetermined time passes after the motion is detected and the thumbnail list 230 is displayed (S720), the controller 160 makes the thumbnail list 230 disappear (S740).

Before the predetermined time passes, the highlight 240 of the thumbnail list 230 indicates which image is being currently displayed (S730). For example, if there is image conversion from the first image 220 to the second image 210 as shown in FIG. 2C, the highlight 240 is positioned between the first image 220 and the second image 210 in the thumbnail list 230 to indicate the current state of the screen (S730). The thumbnail list 230 may move up and down or the highlight 240 may move up and down. If the display apparatus 100 is turned by 180° as shown in FIG. 2B, each of the images in the thumbnail list 230 is turned by 180° accordingly. Therefore, the user is able to know the relative position of the current image in the thumbnail list and determine whether to change the order of the slideshow by viewing the previous image and the next image. The order of the slideshow may be changed by rotating the display apparatus 100.

The foregoing embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A method of displaying images on a display apparatus, the method comprising:
    performing a slideshow displaying a plurality of images including a first image and a second image in a first order on a screen of the display apparatus automatically, wherein the first image has a lower part and an upper part, and the second image has a lower part and an upper part, the upper part of the first image being adjacent to the lower part of the second image;
    when a rotation by 180 degree of the display apparatus is detected, rotating each of the plurality of images displayed on the screen by 180 degree so that each of the plurality of images can be shown in its original orientation and the lower part of the first image is adjacent to the upper part of the second image, and resuming the slideshow displaying the rotated plurality of images in a second order on the screen of the display apparatus, wherein the second order is the reverse direction of the first order.

2. The method as claimed in claim 1, wherein the resuming the slideshow displaying the rotated images in the second order comprises
displaying a list of thumbnail images corresponding to the images along with the images on the screen of the display apparatus for a predetermined time after the detecting the rotation.

3. The method as claimed in claim 2, wherein the predetermined time is set by a user.

4. The method as claimed in claim 2, wherein a display location of the list of the thumbnail images changes corresponding to the rotation.

5. The method as claimed in claim 2, wherein the list of thumbnail images scrolls in a direction corresponding to the second order.

6. The method as claimed in claim 1, further comprising:
    performing another slideshow displaying the images on the screen of the display apparatus simultaneously with performing the slideshow; and
    changing an order of the other slideshow in correspondence with the change in position of the display apparatus.

7. A display apparatus comprising:
    a display unit which displays images on a screen;
    a rotation detector which detects a rotation of the display apparatus; and
    a controller which controls the display unit to display a slideshow displaying a plurality of images including a first image and a second image in a first order automatically, and, wherein the first image has a lower part and an upper part, and the second image has a lower part and an upper part, the upper part of the first image being adjacent to the lower part of the second image, and when a rotation by 180 degree of the display apparatus is detected by the rotation detector, the controller rotates each of the plurality of images displayed on the screen so that the lower part of the first image is adjacent to the upper part of the second image, and resumes the slideshow displaying the rotated plurality of images in a second order on the screen of the display apparatus,
    wherein the second order is the reverse direction of the first order.

8. The display apparatus as claimed in claim 7, further comprising:
    a signal processor which processes the images,
    wherein the signal processor provides an interface through which a user sets a time, and the controller sets the time as the predetermined time.

9. The display apparatus as claimed in claim 8, wherein the controller controls the signal processor and the display unit to display the list of thumbnail images in a changed location corresponding to the rotation.

10. The display apparatus as claimed in claim 8, wherein the controller controls the signal processor and the display unit to scroll the list of thumbnail images displayed on the displayed unit in a direction corresponding to the order in which the images are displayed on the display unit.

11. The display apparatus as claimed in claim 7, further comprising:
    another storage unit that stores other images,
    wherein the controller arranges the other images stored in other storage unit in a third order, arranges the other images stored in the other storage unit in a fourth order corresponding to the change in position in response to detection of the change in position by the position change detector, and controls the signal processor to process the other images in an order corresponding to the third order or the fourth order wherein the display unit displays the other images in the order processed by the signal processor simultaneously with the images.

12. A display apparatus comprising: a position change detector which detects whether a change in a position of the display apparatus occurs; a storage unit which stores a plurality of images including a first image and a second; a display unit; a controller which controls the display unit to display a slideshow of the plurality of images including the first image and tile second image in a first order automatically, wherein the first image has a lower part and an upper part, and the second image has a lower part and an upper part, upper part of the first image being adjacent to the lower part of the second image, wherein the controller rotates each of the plurality of images so that the lower part of the first image is adjacent to the upper part of the second image and controls the display unit to display the slideshow of the rotated plurality of images in a second order if the position change detector detects the change in position while the slideshow of the plurality of images is displayed in the first order, wherein the second order is different than the first order, wherein the controller changes at least one of a display location and an orientation of the plurality of images displayed on the display unit corresponding to the change in position.

13. The display apparatus as claimed in claim 12, wherein the controller controls the display unit to display a list of thumbnail images corresponding to the images, together with the slideshow of the images in the second order, for a predetermined time after the position change detector detects the change in position while the slideshow of the images is displayed in the first order.

* * * * *